United States Patent [19]

Semur et al.

[11] 4,227,094
[45] Oct. 7, 1980

[54] SWITCHING MATRIX FOR WIDE BAND ELECTRIC TRANSMISSION SIGNALS

[75] Inventors: Pierre Semur, Bondoufle; Marcel Basset, Villaine, both of France

[73] Assignee: Compagnie Industrielle des Telecommunications Cit-Alcatel, Paris, France

[21] Appl. No.: 55,670

[22] Filed: Jul. 9, 1979

[30] Foreign Application Priority Data

Jul. 12, 1978 [FR] France .............................. 78 20845

[51] Int. Cl.² ..................... H01H 25/00; H06Q 1/16
[52] U.S. Cl. ................................... 307/113; 307/147; 361/416; 339/18 C; 339/121; 361/394
[58] Field of Search ............... 339/18 R, 18 C, 18 P, 339/119 R, 121; 361/391, 393, 394, 416; 307/112, 113, 115, 147; 340/166 R

[56] References Cited

U.S. PATENT DOCUMENTS

| | | | |
|---|---|---|---|
| 3,305,706 | 2/1967 | Babb | 361/416 |
| 3,331,991 | 7/1967 | Carlisle et al. | 361/394 X |
| 3,833,866 | 9/1974 | Boutelant | 340/166 X |

FOREIGN PATENT DOCUMENTS 7036371  5/1972  France .

*Primary Examiner*—L. T. Hix
*Assistant Examiner*—James L. Dwyer
*Attorney, Agent, or Firm*—Sughrue, Rothwell, Mion, Zinn and Macpeak

[57] ABSTRACT

The present invention relates to switching wide band electric transmission signals. It provides a switching matrix which includes inlet/outlets one of which sets forms the columns while the other set forms the rows of the matrix and switching points disposed at the intersections of the conductors. The wiring of the matrix includes plane supports equal in number to that of its rows and of its columns, each row conductor or column conductor being wired on a distinct support, the supports being assembled in two stacks disposed perpendicularly to each other, one stack being constituted by the wiring supports of the column conductors while the other is constituted by the wiring supports of the row conductors. The figure shows a set of two stacks 204, 205, of four supports in individual screen boxes which form a switching matrix with four rows and four columns. Such a matrix is used advantageously for switching telecommunication signals.

3 Claims, 4 Drawing Figures

SWITCHING MATRIX FOR WIDE BAND ELECTRIC TRANSMISSION SIGNALS

The present invention relates to switching wide band electric transmission signals such as in 12 and 60 MHz high-frequency analog transmission systems. Such systems include high data rate digital transmission systems, television video systems and primary groups, secondary groups, tertiary groups, or quaternary groups as delivered by telephone circuits. Generally, the invention relates to switching devices organized in one or several matrices and, more particularly, to the structure of such switching matrices.

A switching matrix includes inlet/outlets, two sets of conductors which lead to the inlet/outlets, one of them forming the columns and the other forming the rows of the matrix, and controlled switching points disposed at the intersections of the conductors. The electrical characteristics (cross-talk, insertion loss) of a connection established in a switching matrix are degraded by the open switching points directly connected to the row conductor and the column conductor used by the connection as well as by the excess lengths of these conductors which are in shunt on the connection. To limit these degradations, it has already been contrived to divide the matrix type switching devices into a network of smaller or elementary matrices which are pre-addressed by selectors. Despite the limitation of their size, elementary switching matrices remain the main source of degradation in the quality of the connections.

Preferred embodiments of the present invention provide switching matrices with improved characteristics.

The present invention provides a switching matrix for wide band electric transmission signals, said matrix comprising inlet/outlets, two sets of conductors which lead to the inlet/outlets, one of the sets forming the columns while and the outer forming the rows of the matrix, controlled switching points disposed at the intersections of the conductors and constant current sources arranged to control the switching points wherein the switching points are of symmetrical structure being constituted by two half switching points and wherein each row and each column of the matrix is provided on a corresponding plane support with each row conductor or column conductor being wired together with the half switching points which are connected directly to it on a separate support, the supports being assembled in two stacks, one constituted by the supports which contain the row conductors, the other constituted by supports which contain the column conductors, the two stacks being disposed perpendicularly to each other and placed with their edge surfaces against each other, the supports of the two stacks including, at their points of contact connections which provide electrical connections between corresponding pairs of half switching points.

According to a preferred embodiment of the invention, the switching points are formed by two diode half switching points disposed in series and controlled by means of a constant current source. Each half switching point is wired on the support which contains the row or column conductor to which it is directly connected. The electrical connections between the edges of the supports provide the electrical connections between the two half switching points which together constitute a switching point.

The structure according to the invention maintains electrical symmetry between the rows and columns of the matrix.

An embodiment of the invention is described by way of example with reference to the accompanying drawings in which.

An embodiment of a switching device for a wide-band electric transmission signal constituted by a network of elementary switching matrices pre-addressed by selectors will be described hereinafter. In such a device, a connection is established between two inlet/-outlets via a switching point which connects a row to a column in an elementary matrix and via two auxiliary switching points which belong to selectors and one of which connects the row in question to one of the outlets, while the other connects the column in question to the other inlet/outlet.

Figure 1:
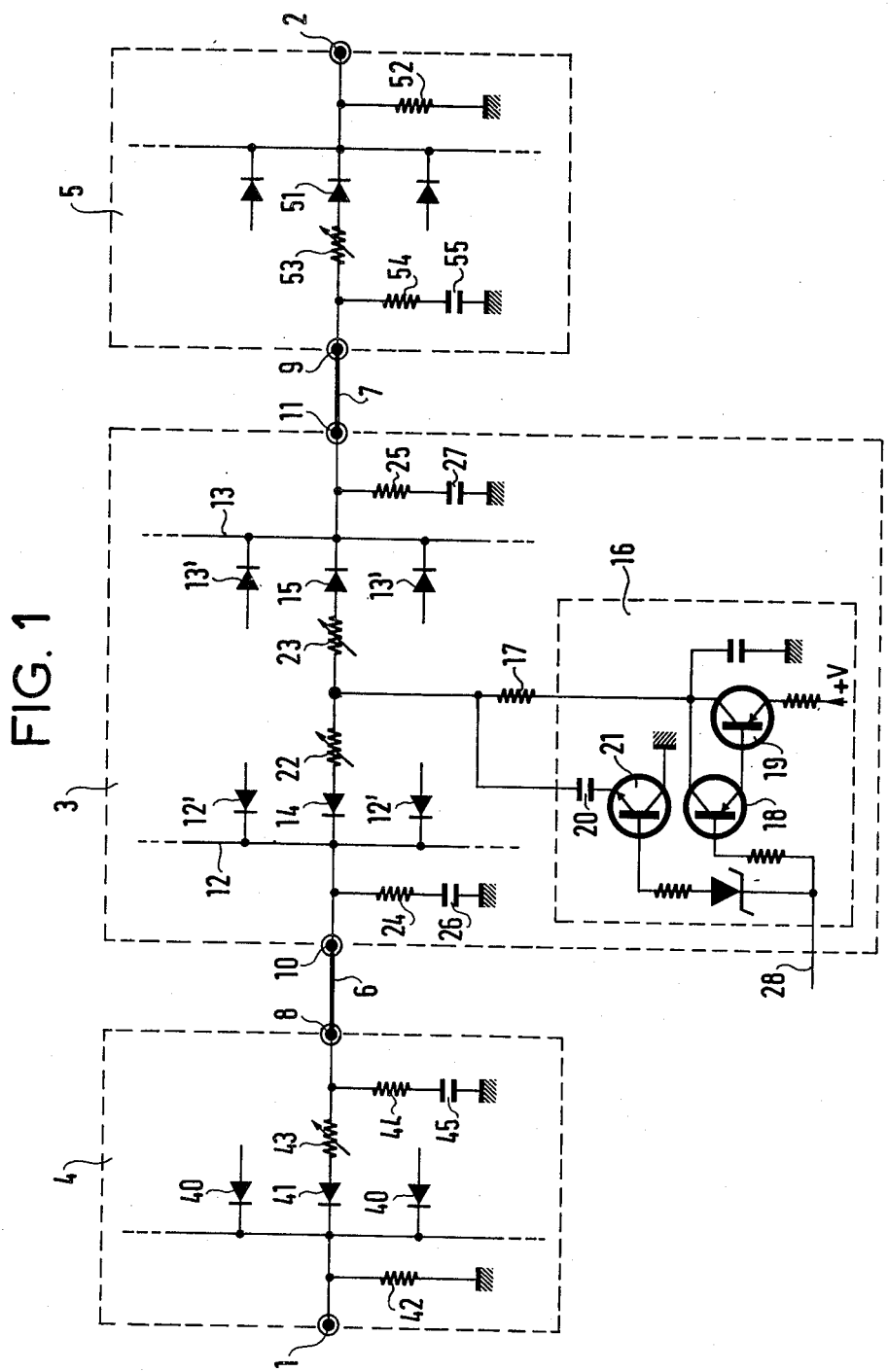
FIG. 1 is the circuit diagram of a connection established in a device formed by a network of elementary switching matrices pre-addressed by selectors.

FIG. 1 gives an example of a circuit diagram for such a connection. The figure shows inlet/outlets 1 and 2 of a switching device between which it is assumed that the connection is established, an elementary matrix 3 and selectors 4 and 5 with switching points through whose diodes the connection passes and coaxial cables 6 and 7 used by the connection between the selectors 4 and 5 and the elementary switching matrix 3.

The selector 4 has an inlet/outlet referred to as a common inlet/outlet which corresponds to the inlet/-outlet 1 of the switching device and several inlet/outlets referred to as in-shunt inlet/outlets each connected to the common inlet/outlet 1 by a respective diode switching point. The switching points of the selector 4 have identical structures. For clearness' sake, FIG. 1 shows only one in-shunt outlet 8—the one which is used by the connection in question—and the switching point which connects it to the common inlet/outlet 1. The existence of the other switching points is deduced from the illustration by diodes 40 whose anodes are shown not connected. The switching point which connects the common inlet/outlet 1 to the in-shunt inlet/outlet 8 principally comprises a diode 41 connected in series between these two inlet/outlets with its cathode towards the common inlet/outlet 1 and a resistor 42 which it shares with the other switching points of the selector 4 and which is connected between earth and the common inlet/outlet 1. The point is conductive when DC bias current passes through the diode 41, said current flowing from the in-shunt inlet/outlet 8 and passing to earth via the resistor 42, and the point is blocked when no DC bias current passes through it.

The switching point which connects the common inlet/outlet 1 to the in-shunt inlet/outlet 8 further includes a resistor 43 disposed in series with the diode 41 and a series circuit which is constituted by a resistor 44 and a capacitor 45 and which is disposed between earth and the in-shunt inlet/outlet 8. These resistor and capacitor components constitute, together with the resistor 42, a π attenuator for matching the impedance of the switching point in the conductive state to that of the coaxial cable 6 which connects it to the elementary switching matrix 3.

The selector 5 has a structure identical to that of the selector 4. Its common inlet/outlet coincides with the inlet/outlet 2 of the switching device. The connection leads to an in-shunt inlet/outlet 9 which is connected to the common inlet/outlet 2 via a switching point which principally comprises a series connected diode 51, with its cathode towards the common inlet/outlet 2, and a resistor 52 which connects the common inlet/outlet 2 to earth. As in the case of the selector 4, a resistor 53 is inserted in series with the diode 51 and a series circuit constituted by a resistor 54 and a capacitor 55 is disposed between earth and the in-shunt inlet/outlet 9.

The elementary switching matrix 3 includes two groups of conductors which, to distinguish them from each other, are referred to as row conductors and column conductors, row inlet/outlets connected to the row conductors, column inlet/outlets connected to the column conductors and controlled switching points which are all identical and are disposed between the row conductors and the column conductors. Any one of its row inlet/outlets can be put in connection with any one of its column inlet/outlets by turning on the switching point placed between the row and the column in question. FIG. 1 only shows the row and column inlet/outlets 10 and 11 related to the connection in question, the row conductor 12, the column conductor 13 and the switching point which is common to both these conductors, while the existence of the other switching points connected to one or other of these two conductors is deduced from the illustration of the diodes 12', 13' whose anodes are shown not connected. The switching points of the elementary matrix 3 are diode switching points. By applying or not applying a bias current the diodes are controlled simultaneously with the switching points of the selectors to which they are directly connected. These switching points have symmetrical structures and are formed by connecting two identical half switching points in series. The switching point which is common to the row and column conductors 12 and 13 principally comprises two diodes 14 and 15 connected in series by their anodes and their bias control circuit 16 which includes firstly a current source formed by the resistor 17 and the Darlington-connected PNP transistors 18 and 19, the positive terminal of said source being connected to the junction point of the anodes of the diodes 14 and 15, and secondly an AC shunt circuit connected between earth and the junction point of the anodes of the diodes 14 and 15 and constituted by a capacitor 20 disposed in series with an NPN type transistor 21 which operates as a switch. The switching point which is common to the row and column conductors 12 and 13 also includes resistors 22 and 23 inserted in series with respective ones of the diodes 14 and 15, and RC series circuits constituted by respective resistors 24 and 25 and capacitors 26 or 27 to earth each row and column inlet/outlet 10 and 11. These resistor and capacitor components constitute, with the resistor 17, an attenuator for matching the impedance of the switching point, when conductive, with that of the coaxial cables 6 and 7.

The bias control circuit 16 can assume one of two states according to a level applied to its control input 28. In a first state which corresponds to a high level, the transistor 21 is non-conductive and the transistors 18 and 19 are conductive. The capacitor 20 is not connected to earth and the circuit acts as a constant current source whose impedance, for AC signals is determined by the value of the resistor 17. Before reaching earth, the constant current discharged by the circuit 16 divides into two parts, one of which passes through the resistor 22 and the diode 14 of the elementary matrix 3, the coaxial cable 6, the resistor 43, the diode 41 and the resistor 42 of the selector 4, while the other of which passes through the resistor 23 and the diode 15 of the elementary matrix 3, the coaxial cable 7, the resistor 53, the diode 51 and the resistor 52 of the selector 5. A transmission signal can then pass along the connection between the inlet/outlets 1 and 2. When the bias control circuit 16 is in a second state which corresponds to a low level applied to its control input, the transistor 21 is saturated and the transistors 18 and 19 are non-conductive. The bias control circuit 16 no longer supplies any current to the diodes 14, 15, 41 and 51 which therefore have high impedance and oppose the passage of any transmission signal. Further, the bias control circuit presents a very low impedance to AC signals because the transistor 21 is saturated, thereby switching the capacitor into circuit. The very low impedance completes the breaking of the connection and reduces crosstalk between the various connections.

As can be seen in FIG. 1 that, when passing through an elementary switching matrix, a connection does not necessarily use the whole length of a row conductor and of a column conductor. The unused lengths which lead to "off" switching points are the seat of reflections and cause poor matching. These reflections must be reduced as much as possible to improve matching and consequently the lengths of cable must be reduced also. To do this, the components of an elementary switching matrix are divided into two stacks of plates disposed perpendicularly to each other and whose end surfaces are placed against each other. The plates of the first stack each include a row conductor as well as the inlet/outlet and the half switching points directly connected to the row connector. The plates of the second stack each include a column conductor as well as the inlet/outlet and the half switching points directly connected to the column conductor. Electric connectors of a complementary type for each stack are disposed on the facing edges of the plates of the two stacks and provide connection of the half switching points of each plate of a stack with a half switching point of each plate of the other stack so as to constitute complete switching points between each row conductor and column conductor of the matrix. The bias control circuit of a switching point is disposed optionally on either one of the plates on which its half switching points are wired.

Figure 2:
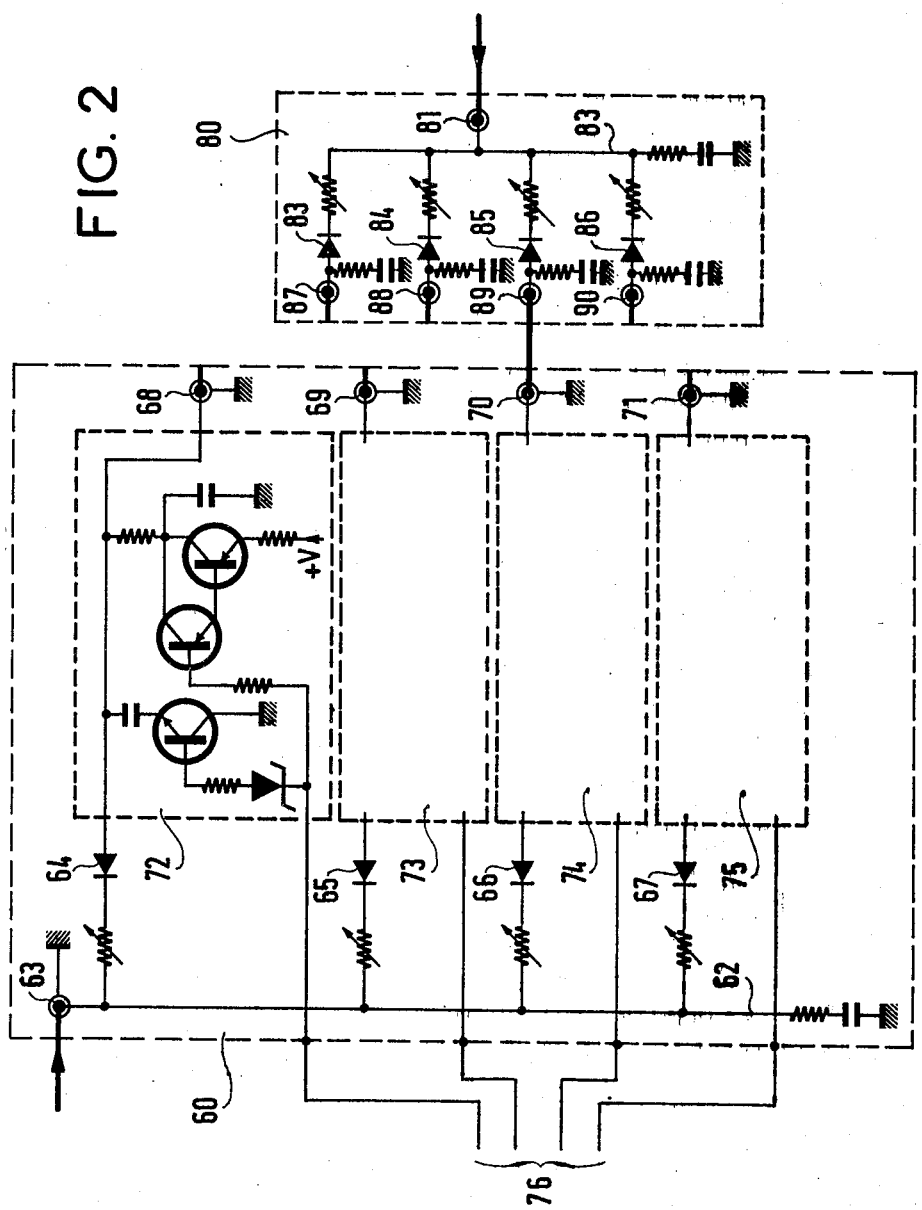
FIG. 2 is a circuit diagram which illustrates the arrangement of the components of an elementary switching matrix among several circuit boards.

FIG. 2 shows two types of circuit board which, grouped in two stacks of four, can constitute an elementary switching matrix which has four rows and four columns with 16 switching points and connections which follow the circuit diagram of FIG. 1. The first type of board 60 includes a row conductor 62, the corresponding row inlet/outlet 63, four half switching points principally constituted by diodes 64, 65, 66 and 67 connected to the row conductor 62 by their cathodes, four coaxial electric connections 68, 69, 70 and 71 connected to the anodes of the diodes 64, 65, 66 and 67 and four bias control circuits 72, 73, 74 and 75 with their control inputs 76, said circuits being identical to one another and corresponding to the circuit 16 of FIG. 1 completed by the resistor 17. The resistor and capacitor components which constitute the π attenuators are also seen, said components, when they are in the conductive state, matching the impedance of the switching points with that of the coaxial connection cables. The second type of board 80 includes a column conductor 83, the corresponding column inlet/outlet 81, four half switching points principally constituted by diodes 83, 84, 85 and 86 connected to the column conductor 83 by their cathodes and four coaxial electric connections 87, 88, 89 and 90 of a complementary type to that of connections 68, 69, 70 and 71 of the plate 60, connected to the anodes of the diodes 83, 84, 85 and 86. This second type of board 80 also includes resistor and capacitor components which constitute π attenuators to match the impedance of the switching points to that of the coaxial connection cables when the switching points are in the conductive state. Both types of board, 60 and 80, are intended to be disposed perpendicularly to each other and to be connected together by pairs of coaxial connections which are represented in FIG. 2 as being the connections 70 and 89. The circuit diagram of the connection thus established between the row inlet/outlet 63 and the column inlet/outlet 81 reproduces that of the connection illustrated in FIG. 1.

An elementary matrix is formed by two stacks, one constituted by four boards of the first type 60, the other by four boards of the second type 80, disposed perpendicularly to each other and electrically connected by coaxial connections, the four coaxial connections of a board of the first type 60 being connected to four coaxial connection belonging to four distinct boards of the second type 80 of the other stack and vice-versa.

Figure 3:
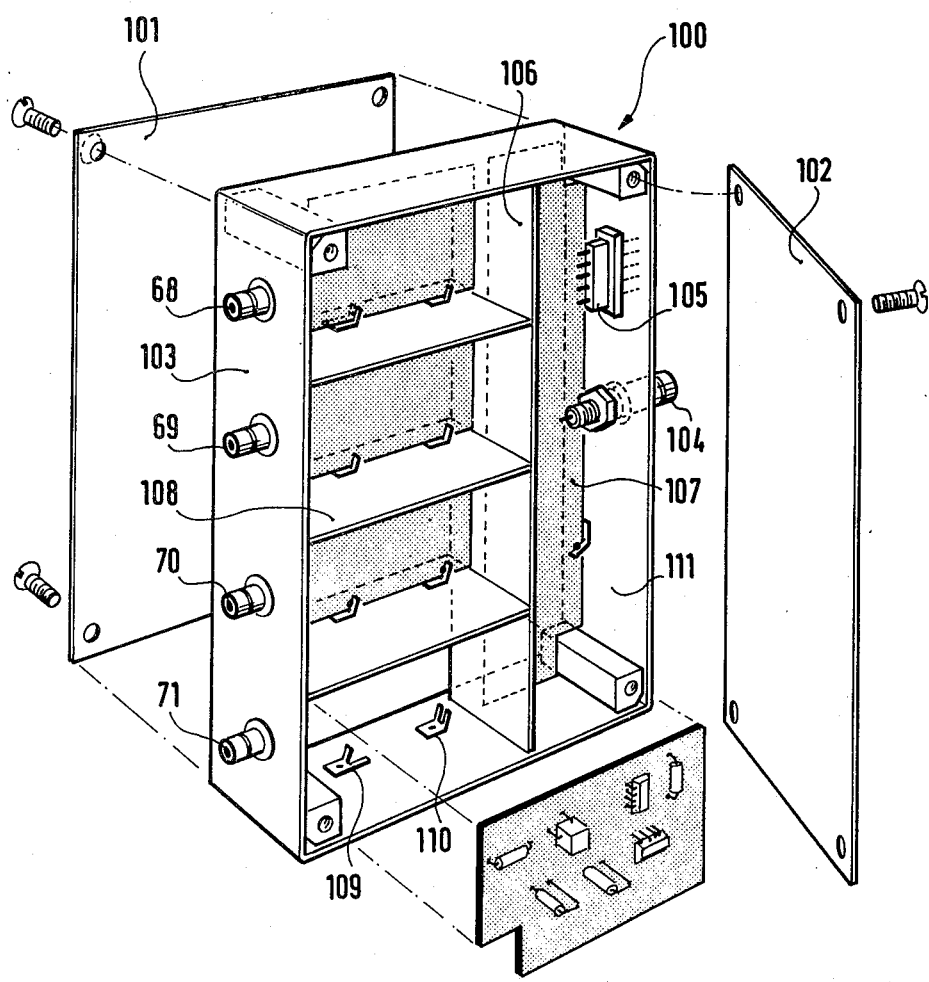
FIG. 3 illustrates the detail of the constitution of an individual screened box for one type of circuit board.
Figure 4:
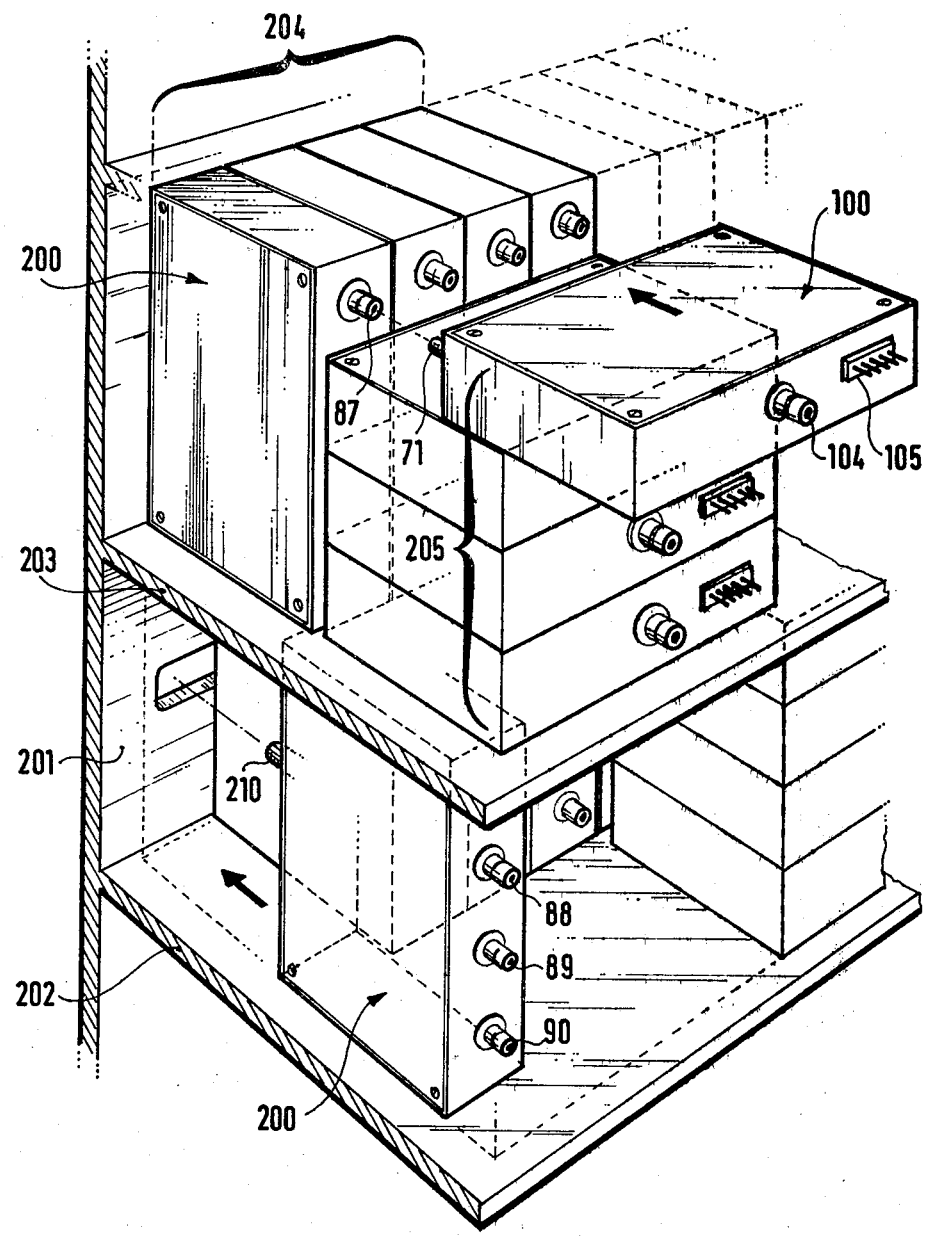
FIG. 4 shows the external appearance of an elementary switching matrix formed by assembling several circuit boards disposed in individual screened boxes.

FIGS. 3 and 4 illustrate a mechanical implementation of such a matrix. The four boards of each type 60 and 80 are disposed in individual screened boxes which are flat rectangular metal boxes all having the same dimensions, with their four coaxial connections aligned along one of the long edge surfaces of the boxes and spaced apart by a distance equal to the thickness of a box.

FIG. 3 illustrates in perspective a plate of the first type 60 and its individual screened box 100. The circuit board is divided into several parts for convenient assembly and its individual screen is shown with its back plate 101 and its cover 102 removed. The back plate 101 and the lid 102 are fixed on the screen box 100 by screws. The coaxial connections 68, 69, 70 and 71 which lead to the four half switching points wired on the circuit board are fixed on the outside along one of the long edges 103 of the box, while the row inlet/outlet and the bias control circuit inlets which are also wired on the plate are accessible respectively by a coaxial connection 104 and a multiple-pin plug 105 disposed on the opposite side of the box along the other long edge 111 of the screened box 100 which is further divided into two compartments by a longitudinal metal partition 106. The compartment 107 in which the coaxial connection 104 and the multiple-pin plug 105 are connected acts as a housing for a part of the circuit board which supports the wiring of the row conductor and the four half switching points. The other compartment is subdivided into four identical rectangular cells to each of which one of the coaxial connections 68, 69, 70 and 71 leads. These cells each contain a part of the circuit board which supports the wiring of a bias control circuit and of a conductor which connects together the coaxial connector, the above-mentioned bias control circuit and a half switching point placed in the compartment 107. The longitudinal partition 106 is provided with electrically insulated through bushings for the passage of this conductor, the power supply conductors and the control input conductors of the bias control circuits in the cells.

To reduce cross-talk, the partitions extend through the entire thickness of the screened box 100 and the circuit board is divided into five parts held in place in their housings by double lugs 109, 110 whose bases are soldered to the walls and bent on either side of the plates when they are installed.

The screened box for a circuit board of the second type 80 referenced 200 in FIG. 4 is shown closed since it has no special characteristics. It has the same dimensions as the screened box 100 of a circuit board of the first type 60 without having the multiple-pin plug thereof because there are no bias control circuits. The coaxial connections (87, 88, 89 and 90, FIG. 2 which lead to the half switching points are aligned with one of the long edges of the screened box and are spaced apart by a distance which corresponds to the thickness of the screened box while the opposite long edge surface carries a coaxial connection 210 which provides access to the column conductor of the circuit board of the second type 80.

FIG. 4 illustrates in perspective the assembly formed by the screened boxes which contain circuit boards of the first type 60 and of the second type 80 for constituting an elementary switching matrix with four rows and four columns. The figure shows a support 201 which includes two shelves 202 and 203 for supporting elementary switching matrices at different stages in their construction. Firstly, as shown, four screened boxes 200 are stacked side by side standing on their end surfaces on the lower shelf 202 and the coaxial connections 87, 88, 89 and 90 are disposed turned towards the front of the shelf. This forms a stack referenced 204 on the upper shelf 203 which has a back surface with a horizontal row of four coaxial connections which correspond to the column inlet/outlets of the matrix and a front surface with a network of 16 coaxial connections which correspond to the 16 half switching points which are directly connected to four column conductors of the matrix. Then, four screened boxes 100 are disposed flat on one another and their rows of four coaxial connections are engaged in those which face the screened box 200. These four screened boxes form a second stack 205 whose front surface has a column of four coaxial connections 104 which correspond to the row inlets of the matrix and a column of four multiple-pin connectors 105 which correspond to the control inputs of the bias control circuit which is used for controlling the 16 switching points.

To constitute a complete switching device, each elementary matrix formed by assembling two stacks of screen boxes 204 and 205 is connected to preselectors, not shown, by the row of coaxial connections 210 disposed on the back surface of the assembly and by the column of coaxial connections 104 which is disposed on the front surface of the assembly.

It is observed that it is possible to reduce the length of the wiring to a minimum while maintaining the electrical symmetry which exists between the rows and the columns of a switching matrix by adopting an elementary matrix structure of two stacks of circuit boards disposed perpendicularly to each other, one stack of boards supporting the circuit of the row conductors and the half switching points which are directly connected to them, and the other stack of boards supporting the circuit of the column conductors and the half switching points which are directly connected to them.

With such a structure, a cross-talk ratio of more than 100 dB and a coefficient of reflection of less than 5% were obtained for a transmission signal with a frequency band of 4 to 60 MHz between two separate paths which passed through the matrix.

Various modifications to the embodiment described above are possible without going beyond the scope of the invention. In particular, the screen boxes can be dispensed with in the case of a transmission signal with a restricted frequency band.

We claim:

1. A switching matrix for wide band electric transmission signals, said matrix comprising inlet/outlets, two sets of conductors which lead to the inlet/outlets, one of the sets forming the columns while the other set forming the rows of the matrix, controlled switching points disposed at the intersections of the conductors and constant current sources arranged to control the switching points wherein the switching points are symmetrical structure being constituted by two half switching points and wherein each row and each column of the matrix is provided on a corresponding separate plane support with each row conductor or column conductor being wired together with the half switching points which are connected directly to it, the supports being assembled in two stacks, one constituted by the supports which contain the row conductors, the other constituted by supports which contain the column conductors, the two stacks being disposed perpendicularly to each other and placed with their edge surface against each other, the supports of the two stacks including, at their points of contact connections which provide electrical connections between corresponding pairs of half switching points.

2. A switching matrix according to claim 1, wherein the constant current sources of all the switching points connected to a row conductor are all wired on the support which contains the said row conductor.

3. A switching matrix according to claim 1 or 2, including individual screened boxes which are rectangular and flat and the same size as each other and each of which contains one plane support, each screened box acting as an element of one of the two stacks and having an edge surface which forms the facing surface of each stack including male/female connectors which provide electrical connections between the two stacks while their opposite edge surfaces include connectors which act as inlet/outlets for the matrix as well as connectors for controlling the switching points.

* * * * *